UNITED STATES PATENT OFFICE.

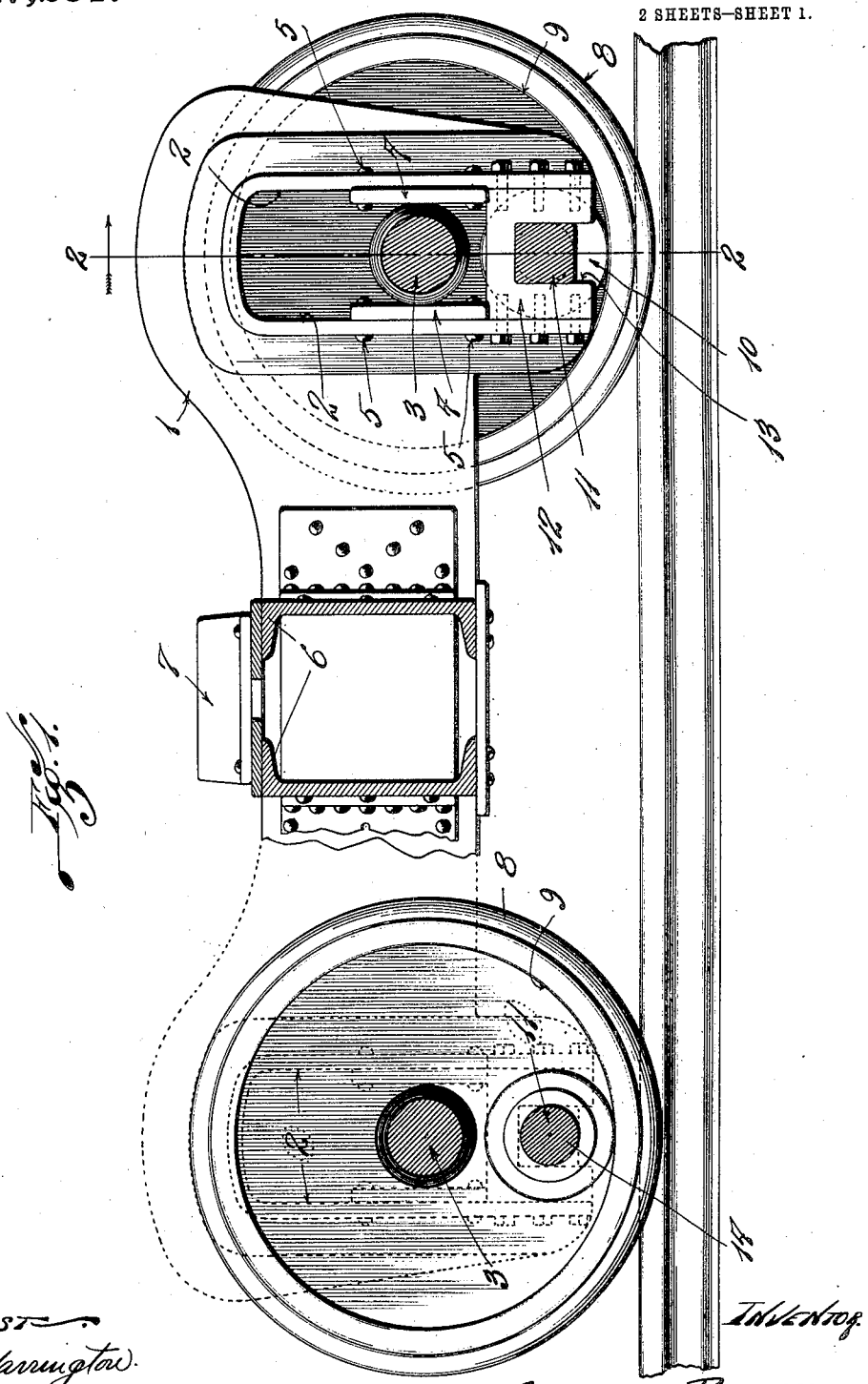

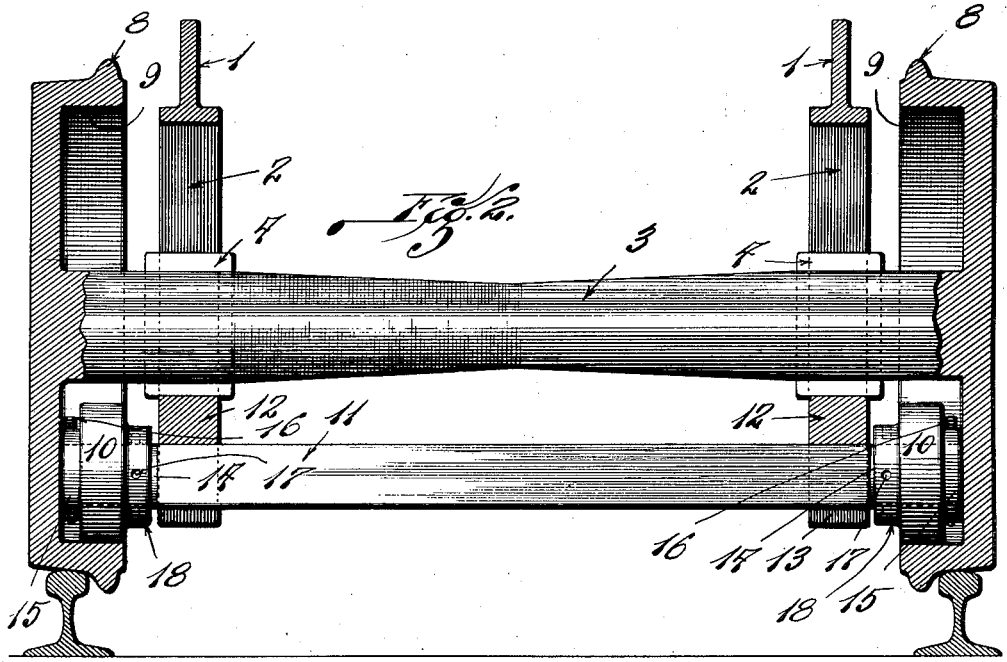
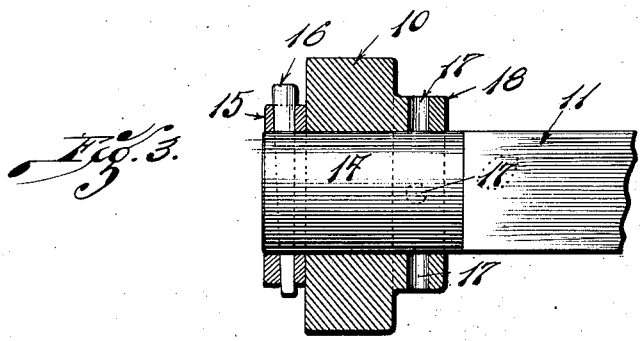

CHARLES PARIDY, OF BELLEVILLE, ILLINOIS.

ANTIFRICTION AXLE-MOUNTING.

1,047,281. Specification of Letters Patent. Patented Dec. 17, 1912.

Application filed June 10, 1912. Serial No. 702,841.

*To all whom it may concern:*

Be it known that I, CHARLES PARIDY, a citizen of the United States, and resident of Belleville, St. Clair county, Illinois, have invented certain new and useful Improvements in Antifriction Axle-Mountings, of which the following is a specification containing a full, clear, and exact description, reference being had to the accompanying drawings, forming a part hereof.

My invention relates to an improvement in anti-friction axle mountings, and consists in the novel construction hereinafter described and pointed out in the appended claims.

The object of my invention is to improve the axle-mounting of car trucks and other machinery, whereby the same will operate with less friction and wear, and be stronger and less liable to disorder.

In the drawings: Figure 1 is a sectional side elevation of a car truck having my invention applied thereto; Fig. 2 is a sectional end elevation of the same, taken on the line 2—2 of Fig. 1, and looking in the direction indicated by the arrow; and Fig. 3 is a sectional elevation of an anti-friction roller mounted on one end of its axle.

The numeral 1 indicates the side frames of the car truck, which are provided near each end with the vertical axle-guides 2, between which the axle 3 is mounted. Oppositely located wear-plates 4 are detachably fixed upon the opposite faces of said axle-guides by means of suitable bolts or rivets 5, for the purpose of receiving the wear caused by contact of the said axle. The said side frames 1 are connected by the usual transom 6, which may be of any common construction and fitted with the usual center bearing 7. The numeral 8 indicates the car wheels, which are, as shown, preferably cast integral with the said axle 3, as I have found that such a casting is very strong and durable, and possesses the great advantage of wheels and axles homogeneously united, making it impossible for the wheels to get loose or come off of their axles. The said wheels 8 have the usual tread and flange, but upon their inner faces at the base of the tread is formed an annular or "endless" track 9, upon which runs an anti-friction roller 10.

The entire weight of the side frames 1, transom 6 and of the car body (not shown) is supported by the antifriction rollers 10 resting upon their annular tracks 9, so that the axles 3 have no weight to support, thus rendering them less liable to breakage than if the weight were supported by them in the usual manner.

The numeral 11 indicates the anti-friction roller axles, which extend across the car truck at a point immediately beneath the axles 3. The body of said anti-friction roller axle 11 is preferably rectangular in cross-section, to prevent said axles from turning in their seats 12. The anti-friction roller axles have their square bodies located in recesses 13 formed in the said seats 12, and the latter are fixed by means of bolts or rivets in the space between said axle-guides at a point beneath said axles 3. The side frames 1 and all the weight supported by them thus rests upon said anti-friction roller axles 11, and they in turn are supported by said anti-friction rollers 10, resting upon said endless tracks 9. The said anti-friction rollers 10 are mounted upon journals 14, formed upon the outer portions of the said axles 11, and said rollers are held in place by means of a collar 15, fixed upon the outer ends of said axles by means of a key or pin 16 driven through registering apertures in the said collar and journal. The numeral 17 indicates a series of oil-passages formed radially in the hub 18 of the said anti-friction rollers 10.

The operation of my improved axle mounting will readily be understood, as will also its advantages.

The principal advantage of my invention lies in the low center of gravity, the weight being supported substantially in the same plane as is the track rails, thus obviating derailments which might occur with ordinary car trucks. Another important advantage of my invention is its "anti-friction" qualities, as I have demonstrated that an axle mounting of my construction generates much less friction than an axle mounting of common construction.

What I claim is:

1. The improved anti-friction axle-mounting, comprising a pair of car wheels connected by an axle, said wheels having internal endless tracks, a non-revoluble axle mounted below said first mentioned axle, rollers mounted upon the said non-revoluble axle, and side frames mounted upon said non-revoluble axle and having opposite axle guides which embrace said first mentioned axle.

2. The improved anti-friction axle mounting, comprising a pair of car wheels connected by an axle and having internal endless tracks, rollers arranged to engage said endless tracks, an axle connecting said rollers, and side frames resting upon said last mentioned axle.

3. In combination with a pair of wheels, each having an internal annular track-way adjacent the periphery of the wheel, a rotatable axle connecting said wheels, a pair of rollers arranged for riding upon said annular track-ways, a non-rotatable axle connecting said rollers, and means supported by said non-rotatable axle for supporting a vehicle body independently of the rotatable axle.

In testimony whereof, I have signed my name to this specification, in presence of two subscribing witnesses.

CHARLES PARIDY.

Witnesses:
  E. L. WALLACE,
  E. M. HARRINGTON.